United States Patent [19]

Bredow et al.

[11] Patent Number: 5,162,060

[45] Date of Patent: Nov. 10, 1992

[54] POLYMER-MODIFIED CEMENTS WITH IMPROVED CHEMICAL RESISTANCE

[75] Inventors: Charles W. Bredow, Doylestown; Frederick J. Schindler, Fort Washington, both of Pa.

[73] Assignee: Rohm and Haas Company, Philadelphia, Pa.

[21] Appl. No.: 450,791

[22] Filed: Dec. 14, 1989

[51] Int. Cl.$^5$ .............................................. C04B 26/06
[52] U.S. Cl. .................................. 106/808; 106/806; 106/727
[58] Field of Search ........................ 106/727, 806, 808

[56] References Cited

U.S. PATENT DOCUMENTS

| | | | |
|---|---|---|---|
| 3,196,122 | 7/1965 | Evans | 427/140 |
| 3,240,736 | 3/1966 | Beckwith . | |
| 3,316,187 | 4/1967 | Grosner . | |
| 3,578,548 | 5/1973 | Wesp . | |
| 3,822,229 | 7/1974 | McMaster . | |
| 3,859,239 | 1/1975 | Van Gils . | |
| 3,915,917 | 10/1975 | Weiant et al. | 524/423 |
| 4,032,487 | 6/1977 | Columbus | 156/329 |
| 4,049,869 | 9/1977 | De Long | 428/552 |
| 4,059,551 | 11/1977 | Weiant et al. | 524/44 |
| 4,160,750 | 7/1979 | Columbus et al. | 106/205 |
| 4,215,179 | 7/1980 | Melamed et al. | 427/379 |
| 4,221,697 | 9/1980 | Osborn et al. | 428/331 |
| 4,222,981 | 9/1980 | Caswell . | |
| 4,342,843 | 8/1982 | Perlinski . | |
| 4,367,298 | 1/1983 | Abbey . | |
| 4,377,433 | 3/1983 | Merz . | |
| 4,392,335 | 7/1983 | Heiman | 428/256 |
| 4,427,804 | 1/1984 | Tortorello . | |

FOREIGN PATENT DOCUMENTS

| | | |
|---|---|---|
| 53-096942 | 8/1978 | Japan . |
| 58-007467 | 1/1983 | Japan . |
| 421659 | 3/1972 | U.S.S.R. . |
| 883114 | 11/1981 | U.S.S.R. . |
| 1014879 | 4/1983 | U.S.S.R. . |

Primary Examiner—William R. Dixon, Jr.
Assistant Examiner—Sue Hollenbeck
Attorney, Agent, or Firm—Marc S. Adler

[57] ABSTRACT

A coating composition is used for coating or overlaying Portland cement concrete or metal. The composition includes a synthetic polymer latex having ureido functional groups, an amine-functional epoxy curing agent, a liquid epoxy resin, and a hydraulic cement. The coating composition has superior thermal shock resistance and low cost in comparison with epoxy/amine-type polymer concrete, and excellent strength development and chemical resistance in comparison with conventional latex-based cementitious compositions. The coating composition can be mixed from a pair of storage-stable components; a dry mix including the hydraulic cement and the epoxy resin, and optionally larger size aggregate, and a wet mix including the polymer latex and the amine curing agent. The two components can be mixed on site to give a fluid coating composition having a good pot life and low viscosity, which rapidly develops strength, and ultimately develops high compressive strength, thermal shock resistance, and resistance to chemical attack, especially attack by aqueous acids.

19 Claims, No Drawings

POLYMER-MODIFIED CEMENTS WITH IMPROVED CHEMICAL RESISTANCE

BACKGROUND OF THE INVENTION

1. Field of the Invention

This invention relates generally to polymer-modified hydraulic cements, and more specifically to polymer latex-modified cement compositions for use in adverse environmental conditions.

2. Brief Description of the Prior Art

Portland cement concrete is widely used in modern construction, being used in a multitude of applications, ranging from forming walls and floors to casting water and sewer pipes and erecting storage tanks. Although it has high compressive strength, and is relatively inexpensive and durable, Portland cement concrete does have a number of disadvantages in various applications. For example, it has poor colorability and tends to effloresce, and has poor resistance to aqueous acids. These properties, in particular the poor aqueous acid resistance, make it desirable to protect Portland cement concrete with a chemically resistant coating or overlay in many applications.

Thick coatings (often referred to as a "topping," "lining," or "overlay" when greater than about 0.25 cm thick) are preferred for long term resistance to chemicals, in applications where significant abrasion is encountered, or where coarse aggregate must be added to provide slip resistance.

Two classes of compositions are in use for forming protective coatings for Portland cement concrete. The first class consists of "polymer concrete" compositions which include reactive organic liquid materials which solidify under cure conditions. The second class is formed of polymer-modified hydraulic cements. Conventional solvent-based organic coating compositions tend not to be used because solvent is retained in thick films, resulting in one cure times and long-term solvent release. Hydraulic cements without polymer modifiers are not useful because they tend to show poor adhesion and chemical resistance, and lack strength.

Polymer concrete compositions typically comprise about 13 percent by weight organic material when formulated for use at about 0.636 cm thickness, and are typically formulated using a binder made up of an epoxy resin and an amine curing agent for the epoxy. While this type of binder can provide reasonable cure and chemical resistance at low cost, cracking and delamination are recognized as problems with epoxy/amine polymer concrete overlays, in particular outdoors. Ultraviolet degradation of epoxy/amine polymer concrete is also recognized as a problem. Even for indoor applications, cracking and desalination can be encountered where the overlays are exposed to changes in temperature such as in food or beverage plants, or pharmaceutical plants, where steam or hot water is used to clean floors.

Polymer-modified hydraulic cements typically employ a lower level of organic materials than polymer concrete, resulting in a coefficient of thermal expansion similar to the Portland cement concrete, and lower materials costs. While polymer-modified hydraulic cements tend to give good resistance to cracking and delamination, their chemical resistance tends to be poorer than desired, in particular their resistance to aqueous acids. Because a lower level of organic materials is generally employed in polymer-modified hydraulic cements than in polymer concretes, and because organic materials are generally more costly as a class than inorganic materials, polymer-modified hydraulic cements are often less costly than polymer concretes.

There is a need for a polymer-modified cementitious composition, and especially a polymer-modified cementitious composition including hydraulic cement, which can be used as a coating or overlay composition for Portland cement concrete, which has a relatively low cost, and good resistance to chemicals, in particular good resistance to aqueous acids.

In addition to relatively high costs, polymer concrete compositions may have a number of other drawbacks such as unacceptable volatility, flammability and toxicity. They may require special equipment to achieve cure, and may require on-site mixing of multiple components, and concomitantly, multiple packages for shipment.

There is a need for a coating composition for Portland cement concrete which requires a minimum of components to be separately packaged and shipped, and mixed together with other materials at the site of the application.

Epoxidized polymeric materials have long been used for modifying hydraulic cements including Portland cement. For example, U.S. Pat. No. 3,449,278 discloses improving concrete strength through use of an emulsified epoxy resin and an amine, the epoxy resin including adducts of epoxide with an excess of styrenated amidoamine, providing good water dispersibility. Another polymeric material used for this purpose has been aqueous latex. Combinations of the two have also been known. For example, U.S. Pat. No. 3,240,736 discloses an aqueous binder or mortar comprising 20–85 percent by weight hydraulic cement, 2–25 percent polymer latex as a plasticizer, and 10–50 percent ambient curing resin selected from epoxide, polyurethane, polyester and silicone. Water is added to cure the hydraulic cement; and a curing agent for the resin is used: polyamide for the epoxide resin, an amine for the polyurethane, a peroxide for the polyester, and a low molecular weight polyamide for the silicone. Similar compositions without hydraulic cement are disclosed for similar applications in U.S. Pat. No. 3,316,187, in which phenolic microballoons are substituted for the hydraulic cement of the '736 patent. U.S. Pat. No. 3,822,229 discloses a plastic aqueous binder mixture consisting essentially of 20–85 percent by weight hydraulic cement, 15–50 percent liquid epoxy resin and curing agent, and 2–25 percent of polymeric latex solids. A special plasticizing agent is disclosed, the plasticizing agent including a film forming copolymer and a carbocyclic compound with two vicinal carboxy groups, such as phthalic acid. The latex can be advantageously dried and packaged with the cement, reducing the number of components and packages required. Soviet patent 883114-A discloses a corrosion-resistant industrial flooring composition including a synthetic rubber latex, an epoxydimethylhydantoin resin, marshalite and an amino-phenol epoxy curing agent.

Combinations o latex polymers and epoxy resins are also known in the adhesive arts. For example, U.S. Pat. No. 4,588,757 discloses a method of synthesizing an emulsion polymer having a glass transition temperature of from about −10° C. to −50° C. in the presence of an epoxy resin. The resulting material is mixed with an aqueous emulsion of an amine-functional resin to give an adhesive for bonding plastic substrates. U.S. Pat. No. 4,510,274 discloses an adhesive composition including an ethylene/vinyl acetate/acid/acrylamide latex polymer, an epoxy resin, and an amine for laminating polyolefin films. U.S. Pat. No. 4,532,273 discloses an adhesive composition for automotive applications. The adhesive includes a latex polymer, an epoxy resin, a tackifier and an amine curing agent, the latex being polymerized from monomer including an adduct of epichlorohydrin and a tertiary amine ester of (meth)acrylic acid. U.S. Pat. No. 3,578,548 discloses the use of an epoxy resin as a transient tackifier for latex-based pressure sensitive adhesives. An adduct of epoxy resin and diethlyenetriamine (DETA) is use to cure the transient tackifier. Soviet patent 421559-A discloses a composition useful as an adhesive for industrial flooring, the composition including 19-34 percent by weight epoxy resin, 1-12 percent liquid latex, 2-10 percent polyethylenepolyamine hardener, 40-70 percent filler, and 7-14 percent tetraethoxysilane. European patent application 245012 discloses a two-part composition, the first part including an oil-soluble catalyst for carboxyl-/epoxy cure and an epoxy emulsion, the second part including a butadiene-styrene latex polymer and a water-soluble amine. When mixed the two parts provide a long-pot life epoxy/carboxylated latex having a quick film cure. Compositions including latex polymer, epoxy resin, and epoxy curing agents other than catalysts for epoxy-carboxyl are disclosed, for example, in U.S. Pat. Nos. 4,520,107, 4,522,962, 4,510,274, 4,427,804, 4,485,200, 4,367,298, 4,342,843, 4,377,433, 4,222,981, and 3,859,239, Soviet patent 1014879-A, Japanese unexamined patent publications (Kokai) 58-007467, 53-096942, and 50-111129, and Canadian patent 1,043,486.

Combinations of latex polymers and epoxies have also been disclosed in other arts. For example, U.S. Pat. No. 4,049,869 discloses a composition including a high-acid acrylic latex (e.g. 14 percent acrylic acid), an ultraviolet absorber, and a crosslinking agent, for use in preserving porous inorganic substrates. The crosslinking agent can be epoxy resin, and polyethyleneimine or melamine resin can be optionally included.

Organosilanes are known for use in treating cementitious surfaces to improve adhesion. U.S. Pat. No. 4,626,567 discloses a water-resistant acrylic latex sealant composition which includes an organoaminosilane, as well as a small amount of silica, such as a fumed silica, which cooperates with the silane to provide enhanced adhesive properties. U.S. Pat. No. 4,518,653 discloses a glass fiber treatment employing a composition including an epoxy resin, polyvinyl pyrrolidone, an emulsifier or dispersible nontacky film-forming polymer, such as a bisphenol polyester resin, and methacryloxyalkytrialkoxy silane.

While some compositions are known to provide specific properties which are desirable for Portland cement concrete overlays, such as long pot life, rapid early strength development, high ultimate strength, good resistance to chemicals and delamination by thermal shock, and two-component packaging and mixing, no single prior composition is known to provide a desirable balance of all these properties. There is a need for a coating or mortar mix composition, including a hydraulic cement such as Portland cement, which can be packaged as a two component system, and subsequently stored and later transported to the site of application, where the two components can be mixed together with water to provide a coating composition with good pot life, but which rapidly develops strength after application, ultimately providing a coating with good chemical and thermal shock resistance for a Portland cement concrete or metal substance.

SUMMARY OF THE INVENTION

The present invention advantageously provides a polymer modified cementitious composition for use as a coating or overlay composition for use in coating and overlaying Portland cement concrete and metal, such as for repair of corroded bride decks and for restoration o flooring suffering from damage from chemical exposure. The polymer-modified cementitious composition of the present invention advantageously passes thermal shock testing, even after high temperature cycles which cause failure with conventional epoxy-based polymer concrete compositions. The polymer-modified cementitious composition can be advantageously formulated as a two-package system, the coating composition being mixed from a pair of storage-stable components which can be separately mixed, stored, and later transported to a remote application site, where they can be mixed together with water with conventional equipment to provide a fluid coating composition having a long pot life and low viscosity, permitting easy and rapid application to the substrate. The thickness of fluid, uncured composition which can be applied to and cured over a substrate, can vary over a wide range, with coatings both as thin as 0.05 cm and as thick as 5.0 cm curing readily and thoroughly. The cured cementitious composition has greater ultimate strength and good chemical resistance, especially resistance to aqueous acids and organic solvents, compared with unmodified compositions and is less costly than polymer concrete based on epoxy resins.

The polymer-modified cementitious composition of the present invention includes:
 (a) at least one hydraulic cement;
 (b) at least one alkali-stable, film-forming synthetic polymer lates, the polymer latex including ureidofunctional groups;
 (c) an epoxy curing agent, the epoxy curing agent being soluble or dispersible in water; and
 (d) at least one liquid epoxy resin.

This composition shows enhanced ultimate strength and chemical resistance in comparison with unmodified cementitious compositions. Preferably, the weight ratio of the sum of the polymer latex solids, the epoxy resin, and the amine-curing agent (that is, the total organic solids) to hydraulic cement is from about 0.1 to 0.3. The glass transition temperature of the polymer latex is preferably about 0° C. to 30° C.

In a presently preferred embodiment of the present invention, Type I Portland cement is employed as the hydraulic cement.

In another presently preferred embodiment, Type III Portland cement is used, and the composition includes an accelerator selected from the sodium ion containing accelerators, such as sodium carbonate or sodium hydroxide. This cementitious composition shows early strengths typical of Portland cement compositions, while additionally providing enhanced ultimate strength and chemical resistance over conventional cementitious compositions without polymer modification.

DETAILED DESCRIPTION

The cementitious compositions of the present invention are of the type sometimes referred to as "mortars," "toppings," "overlays," or the like in the art. A general description of such materials and their application and use can be found in P. Maslow, *Chemical Materials For Construction* (Structures Publishing Co., Farmington, MI 1974). They are "polymer-modified concretes" in that they do include Portland cement or another hydrualic cement as an admixture. However, they are distinguishable form "polymer concretes" formed by in-situ bulk polymerization of a vinyl monomer, such as methyl methacrylate.

The cementitious composition o the present invention includes a synthetic polymer latex having ureido functionality. While any type of latex having ureido functionality that dries to a strong, water resistant film can be used, preferably, the synthetic polymer latex employed in the coating composition comprises a synthetic polymer latex selected from acrylic polymer latexes, styrene/acrylic copolymer latexes, styrene/butadiene copolymer latexes, acrylonitrile/butadiene polymer latexes, chlorinated vinyl polymer latexes, and hydrophobic vinyl acetate copolymer latexes.

By "acrylic polymer latex" is meant a polymer latex polymerized from monomers comprising substantially polymerizable monomers including the acryl group ($-COCH=CH_2$) or methacryl ($-COC(CH_3)=CH_2$) group, and specifically greater than about 80 weight percent (meth)acrylic monomers, based on the total monomer weight. By "hydrophobic" vinyl acetate copolymer latexes is meant those copolymer latexes of vinyl acetate, such as ethylene/vinyl acetate copolymer latexes, which dry to form water-resistant films, in contrast to films formed by vinyl acetate homopolymer latexes, which tend to be water-sensitive. When the polymer latex is to be packaged with an amine, such as when preparing one component of a two component "system" (the two components to be later mixed on site along with the required hydraulic cement and water to provide a coating composition of the present invention), an alkaline-resistant polymer latex is preferred, such as an acrlic, styrene/acrylic, or styrene/butadiene polymer latex. Mixtures of polymer latexes that are compatible on formulation (that is, when mixed) can be used. Mixtures of polymer latexes which are thermodynamically compatible on drying, that is mixtures which do not phase-separate during drying, can also be used.

Compositions of the present invention which include a ureido functional acrylic polymer latex are especially useful, as cementitious compositions prepared using acrylic polymer latexes which do not have ureido functionality may exhibit an impractically brief pot life.

The polymer latex used in the present invention can be prepared by any technique known in the art, such as suspension polymerization, interfacial polymerization, or emulsion polymerization. Emulsion polymerization techniques for preparing aqueous dispersions of latex polymer particles from ethylenically unsaturated monomers are well known in the polymer arts, and any conventional emulsion technique can be used, such as single and multiple shot batch processes, and continuous processes. If desired, a monomer mixture can be prepared and added gradually to the polymerization vessel. The monomer composition within the polymerization vessel can be varied during the course of the polymerization, such as by altering the composition of the monomer being fed into the vessel. Both single and multiple stage polymerization techniques can be used. The latex polymer particles can be prepared using a seed polymer emulsion to control the number of particles produced by the emulsion polymerization as is known in the art. The particle size of the latex polymer particles can be controlled by adjusting the initial surfactant charge as is known in the art. The preparation of polymer latexes is discussed generally in D. C. Blackley, *Emulsion Polymerization* (Wiley, N.Y. 1975).

Aggregation of latex polymer particles is discouraged by including a micelle-forming, stabilizing surfactant in the polymerization mix. In general, the growing latex particles are stabilized during emulsion polymerization by one or more surfactants such as an anionic or nonionic surfactant, or a mixture thereof, as is well known in the polymerization art. Many examples of surfactants suitable for emulsion polymerization are given in *McCutchen's Detergents and Emulsifiers* (MC Publishing Co., Glen Rock, NJ), published annually. Other types of stabilizing agent, such as protective colloids, can also be used.

Preferably, the cementitious composition includes nonionic surfactant in sufficient quantity to provide a suitable pot-life for the fluid composition. A portion of this nonionic surfactant can be added during polymerization for the purpose of obtaining a polymer latex with specific characteristics. For example, a specific polymerization process may require the addition of a substantial amount of nonionic surfactant to promote the stability of the polymer latex. In addition, nonionic surfactant can be added to the desired level at some point after the polymerization is completed.

Examples of polymer latexes which can be empoyled in the compositions of the present invention include those polymerized from ethylenically unsaturated monomers, such as alpha, beta-ethylenically unsaturated monomers, including styrene, butadiene, alpha-methyl styrene, vinyl toluene, vinyl naphtahalene, ethylene, vinyl acetate, vinyl versatate, vinyl chloride, vinylidene chloride, acrylonitrile, methacrylonitrile, (meth)acrylamide, various ($C_1$-$C_{20}$) alkenyl esters of (meth)acrylic acid; for example, methyl (meth)acrylate, ethyl (meth)acrylate, n-butyl (meth)acrylate, isobutyl (meth)acrylate, 2-ethylhexyl (meth)acrylate, cyclohexyl (meth)acrylate, n-octyl (meth)acrylate, n-decyl (meth)acrylate, n-dodecyl (meth)acrylate, tetradecyl (meth)acrylate, n-amyl (meth)acrylate, neopentyl (meth)acrylate, cyclopentyl (meth)acrylate, lauryl (meth)acrylate, oleyl (meth)acrylate, palmityl (meth)acrylate, and stearly (meth)acrylate; other (meth)acrylates such as isobornyl (meth)acrylate, benzyl (meth)acrylate, phenyl (meth)acrylate, 2-bromoethyl (meth)acrylate, 2-phenylethyl (meth)acrylate, and 1-naphthyl (meth)acrylate; alkoxyalkyl (meth)acrylate such as ethoxyethyl (meth)acrylate; mono- and dialkyl ethers of ethylenically unsaturated di- and tricarboxylic acids and anhydrides, such as ethyl maleate, dimethyl fumarate, trimethyl aconitate, and ethyl methyl itaconate. As used in the present specification and claims, "(meth)acrylate" denotes both "acrylate" and "methacrylate."

The ethylenically unsaturated monomer can also include at least one multi-ethylenically unsaturated monomer effective to raise the molecular weight and crosslink the polymer. Examples of multi-ethylenically unsaturated monomers that can be used include allyl (meth)acrylate, tripropyleneglycol di(meth)acrylate, diethyleneglycol di(meth)acrylate, ethyleneglycol di(- meth)acrylate, 1,6-hexanediol di(meth)acrylate, 1,3-butyleneglycol (meth)acrylate, polyalkylene glycol di(meth)acrylate, diallyl phthalate, trimethylolpropane tri(meth)acrylate, divinyl benzene, divinyl toluene, trivinyl benzene, and divinyl naphthalene.

Ureido-functional and thioureido-functional polymerizable monomers are well known in the art as adhesion-promoting monomers for polymer latex adhesive and coatings compositions. The presence of the ureido group on the polymer latex can be achieved by including one or more copolymerizable ureido-functional monomers in the monomer mixture from which the polymer latex is polymerized. Alternatively, the ureido group or thioureido group can be introduced by chemical modification of the polymer latex subsequent to polymerization, such as disclosed, for example, in U.S. Pat. Nos. 3,300,429 and 4,248,754.

Examples of copolymerizable ureido- and thioureido-functional monomers include ethylenically unsaturated monomers such as beta-(N,N'-ethyleneureido)ethyl acid maleate, beta-(N,N'-ethyleneureido)ethylacid fumarate, methyl beta-(N,N'-ethyleneureido)ethyl fumarate, ethyl beta-(N,N'-ethyleneuriedo)ethyl fumarate, beta-ureidoethyl (meth)acrylate, N-methylol-N'-methylacryloxyethylurea, beta-thioureidopropyl (meth)acrylate, beta-ureidoethyl vinyl ether, beta-ureidoethyl vinyl sulfide, 5-ureidopentyl sulfide, N-vinyl-N,N'-ethylene urea, N-vinyl-N,N'-ethylene thiourea, N-vinylthiopropyl-N,N'-propylene urea, N-(beta-(meth)acrylamidoethyl)-N,N'-ethylene urea, N-(3-acryloxypropyl)-N,N'-trimethylene urea, (meth)acryloxyethyl)-N-ethylene urea, N-[beta-(alpha-(meth)acryloxyacetoamido)ethyl]-N,N'-ethylene urea, N-[beta-(alpha-carboxymethylacrylamido)ethyl]-N-methylol-N,N'-ethylene urea, N-[beta-(2-keto-1-hexahydroxy-pyrimidinyl)propyl] maleimide, N-[beta-(beta-carboxyamido)-ethyl]ethylene thiourea, N-dimethylaminoethyl-N'-vinyl-N,N'-trimethylene thiourea, adducts formed by the successive reaction of aminoalkyl ureas and maleic anhydride; adducts of 2-hydroxyethyl ethylene urea, maleic anhydride and 1,2-propylene oxide, the adduct formed by the successive reaction of 2-hydroxyethyl ethylene urea, 1,2-propylene oxide, and allyl glycidyl ether; the sequential reaction product of 2-aminoethyl ethylene urea with the glycidyl ether of neodecanoic acid, and allyl glycidyl ether; vinyl, allyl and methallyl esters of N-ethyl-beta-(ethylene ureido) succinic acid; N-beta-allylamino) ethyl ethylene urea, allyl (beta-1-ethylene ureido) ethyl carbonate, N-(beta-1-ethylene ureido) ethyl allyloxyacetamide, allyl N-methyl-N-beta-(1-ethylene ureido) ethyl carbamate, alkaline adducts 1,3-bis-[2-(2-oxo-1-imidazolidinyl) -ethyl] urea and allyl glycidyl ether, and the like. Preferably, the polymer latex employed in the compositions of the present invention includes from about 0.002 to 0.006 moles of ureido functional groups per 100 grams of polymer latex solids, and the polymer latex is polymerized from monomer including from about 0.002 to 0.006 moles of ureido-functional monomer per 100 grams polymer latex solids.

Small amounts of other types of copolymerizable monomers can also be included in the monomer mix from which the synthetic polymer latexes used in the present invention can be prepared. For example, small amounts of acid-functional copolymerizable monomer of the type typically included to confer colloidal stability can be used. Examples of acid-functional copolymerizable monomers include acrylic acid, methacrylic acid, itaconic acid, beta acryloxypropionic acid, and the like. Small amounts of copolymerizable momoners having other types of functionality can also be included, such as adhesion-promoting monomers.

Examples of synthetic polymer latexes which can be used include acrylic copolymer latexes, such as butyl acrylate/methyl methacrylate/acid and ethyl acrylate/methyl methacrylate/acid copolymer latexes; vinyy acetate homopolymer and copolymer latexes, including ethylene/vinyl acetate copolymer latexes, styrene/butadiene copolymer latexes, and the like.

In a presently preferred embodiment of the invention, an acrylic latex copolymer is employed, the copolymer being polymerized from monomer comprising 45.6 percent by weight butyl acrylate, 52.4 percent by weight methyl methacrylate, one percent by weight of a ureido-functional methacrylate, and one percent methacrylic acid. The copolymer is prepared by a gradual addition thermal technique with persulfate as the initiator ("Emulsion Polymerization of Acrylic Polymers," Rohm and Haas Co., Phila., PA). This polymer latex has a calculated glass transition temperature of 10° C. to 16° C.

In general, polymer latexes which dry to form strong, water resistant films are preferred. In order to avoid cracking during drying of the coating composition of the invention, the glass transition temperature (Tg) of the synthetic polymer is preferably less than about 30° C., and preferably less than about 25° C. when copolymers of butyl acrylate and methyl methacrylate are used. Synthetic polymers having a glass transition of temperature of greater than about 25° C. and which are more hydrophilic than butyl acrylate/methyl methacrylate copolymers can also be used, where water provides more plasticization during film formation.

In order to maximize the compressive strength of the cured coating composition when used for indoor flooring applications, it is preferred that the glass transition temperature of the polymer latex be greater than about 02 C. for coating or overlay compositions intended for such applications. A general description of indoor flooring applications for this type of material is provided in Chapter 2 of P. Maslow, *Chemical Materials For Construction.*

The synthetic polymer latex preferably provides from about 60 to 75 percent by weight of the total organic solids of the coating composition, the remainder being provided by the epoxy resin, amine functional curing agent, et al.

The weight ratio of latex polymer solids to the sum of the epoxy resin and the epoxy curing agent is preferably from about 60:40 to 75:25, and more preferably from about 70:30 to 75:25.

The composition of the present invention includes at least one epoxy resin. Preferably, the epoxy resin is liquid at the temperature at which the coating composition is applied. Epoxy resins which can be used in the coating composition of the present invention include epoxy resins containing an average of greater than one epoxy group. Examples of epoxy resins which can be used include reaction products of epichlorohydrin with bisphenol A or bisphenol F, epoxidized novolac resins formed by reaction of epichlorohydrin with the reaction product of phenol (or substituted phenols) with formaldehyde; reaction products of epichlorohydrin and an aliphatic polyol such as glycerol, 1,4-butanediol, poly(oxypropylene) glycol or similar polyalcohol components. Mixtures of such resin can also be employed. A suitable bisphenol A-type epoxy resin is available from ShellChemical Co. as Epon ® 828 resin. Mixtures of epoxy resins, including mixtures with reactive epoxy-functional diluents, can also be used.

The epoxy resin can be blended directly with the hydraulic cement and any sand or fine particle size filler used to provide a "dry" component for preparing the coating composition of the present invention. The dry component can be separately packaged and stored, and subsequently shipped to the site at which the coating composition is to be applied. The dry component including the epoxy resin can be mixed on site with a "wet" component including the amine-functional epoxy curing agent. The liquid epoxy resin can be blended directly with the hydraulic cement, sand, etc., or the resin can be first emulsified using conventional emulsification processes.

Virtually any polyfunctional amine containing active hydrogen as a primary or secondary substituent can be employed in the coating compositions of the present invention as amine-functional epoxy curing agents. Examples of amine-functional epoxy curing agents include ethylene diamine, diethylamine triamine, triethylene tetramine, polyoxypropylene amines such as Jeffamine ® D-230, amine-functional acrylic resins such as disclosed in U.S. Pat. No. 4,120,839, modified aliphatic polyamines such as Ancamine ® 1922 and Ancamine 2021, cycloaliphatic Mannich bases such as Ancamine 1732, modified cycloaliphatic polyamines such as Ancamine 1955, trimethyl hexamethylene diamine, isophorone diamine, and tetraethylene pentamine. Mixtures of amine-functional epoxy curing agents can also be used. A presently preferred epoxy curing agent is Jeffamine D-230, an oligomeric propylene oxide diamine. Preferably, the amine functional epoxy curing agent is selected to provide ample pot life for the mixed coating composition and low viscosity to ease application of the fluid coating composition to the substrate. For adequate pot life and low viscosity, diamine oligomers of ehtylene glycol and diamine oligomers of propylene glycol are preferred.

Early strength development is an important and advantageous property of the coating compositions of the present invention. The hardening of the hydraulic cement is believed to control the early strength development.

The expression "hydraulic cement" as used in the present specification and claims is meant to include all such chemical combinations of lime, silica, and alumina, or of lime and magnesia, silica, and alumina and iron oxide (magnesia, for example, may replace part of the lime, and iron oxide may replace part of the alumina), as are commonly known as hydraulic natural cements. Hydraulic natural cements include grappier cements, pozzolan cements, natural cements, Portland cements, white cements, and aluminous cements. Pozzolan cements include slag cements made form slaked lime and granulated blast furnace slag. Portland cement is generally preferred for its superior strength among the natural cements. In addition to ordinary construction grades of Portland cement or other hydraulic natural cements, modified natural cements and Portland cements such as high-early strength cement, heat-resistant cement, and slow-setting cement can be used in the present invention. Among the Portland cements, any of ASTM types I, II, III, IV, or V can be used. However, in one presently preferred embodiment Type III Portland cement is preferred, while in another presently preferred embodiment, Type I Portland cement is preferred.

The organic components of the compositions of the invention tend to retard the cure of the hydraulic cement. The retardation can be ameliorated by addition of cement cure accelerators to the coating composition. Hydraulic cement cure accelerators are well known in the art.

It is preferred that a sodium ion-containing accelerator be employed, such as sodium carbonate or sodium hydroxide, as the presence of a sodium ion-containing cure accelerator has been found to provide surprising accelerated strength development.

The cementitious composition of the present invention can optionally include an amine-functional or an epoxy-functional silane.

Examples of suitable amine-and epoxy-functional silanes include N-(2-aminoethyl)-3-aminopropyl trimethoxysilane, N-(2-aminoethyl)-3-aminopropyl methyldimethoxysilane, (amino ethylaminomethyl)-phenylethyl trimethoxysilane, 4-aminobutyl dimethylmethoxysilane, 4-aminobutyl triethoxysilane, N-2-amino ethyl-3-aminopropyl tris(2-ethylhexoxy)silane, p-aminophenyl triethylsilane, 3-aminopropyl dimethylethoxysilane, 3-aminopropyl methyldiethoxysilane, 3-aminopropyl triethoxysilane, 3-aminoporpyl trimethoxysilane, diethylenetriaminepropyl trimethoxy silane, glycidoxypropyl trimethoxysilane, bis(3-glycidoxypropyl) tetramethyldisiloxane, 3-glycidoxypropyl dimethylethoxysilane, and (3-glycidoxypropyl) methyldiethoxysilane. The silane can be added directly to the cementitious composition mixture. Alternatively, the silane can be predispersed or dissolved in water or a solvent such as methanol before being added to the cementitious composition mixture. Mixtures of silanes can also be used. The amount of silane employed is related to the type and proportion of fillers used in the coating composition, Preferably, the silane is employed in the cementitious composition at a level of at least about 0.1 percent by weight based on hydraulic cement solids. The silane enhances acid resistance of the cured cementitious composition, but tends to retard cure.

Frequently, it is advantageous to incorporate sand or larger aggregate in the cementitious composition. Sand and aggregate can also be included in the cementitious composition to lower cost or to provide desired properties. The nature of the sand or aggregate will be dictated by the intended use of the cementitious composition. For masonry paints or plasters, it is possible to use any kind of sand of small particle size, preferable a sand having an average particle size of one millimeter or less. On the other hand, in those cases in which the cured cementitious composition is subject to exact requirements, such as in the case of a cement patch applied to an existing concrete floor, graded sands of medium average particle size, such as "Best" sand and "Ottawa" sand, or a mixture of the two, can be used more advantageously. Best sand is of the type known as "sharp," while Ottawa sand is of the type known as "round."

Examples of sands which can be included in the coating composition include Ottawa 20-30 mesh, ASTM C190, available from Fisher Scientific Co., Pittsburgh, PA; MDC No. 2 sand and 70 mesh sand, available from MDC Industries, Phila., PA; and GS gray sand, available from Stonhard, Inc., Maple Shade, NJ. Mixtures of large particle size fillers can be used to minimize the proportion of organic binder required to provide a mortar with good rheological properties. In a presently preferred embodiment, the cementitious composition of the present invention includes from about 20 to 40 weight percent of a sand formed of angular particles having an average size of about 0.1 to 0.25 mm, such as MCDC 70 mesh sand, from about 20 to 40 weight percent of a sand formed of round particles having an average size of abut 0.5 to 1.0 mm, such as Ottawa 20–30 mesh sand, from about 20 to 40 weight percent of sand formed of angular particles having an average size of about 1 to 3 mm, such as MDC No. 2 sand, and about 20 to 40 weight percent hydraulic cement.

In general, the nature of the sand to be used will be dictated by the intended use of the cured cementitious composition. For flooring applications, graded sands of medium particle size such as "Ottawa" sand, "MDC 70" sand, and "MDC No. 2" sand, and mixtures thereof, can be used to advantage. In such medium grade sands, fines will have been removed, yet the sieve size of the sand may vary over a fairly wide range.

Instead of or in addition to sand, it is possible to use ground glass, emery powder, diatomaceous earth, ground slag, fine gravel, trap rock, and similar aggregates.

The ratio of sand to cement can vary from about 2 to 1 to about 4 to 1 on a weight basis.

The coating composition of the present invention can, if desired, additionally include a fine particle size mineral as a filler. A fine particle size silica can be used, for example. As used in the present specification and claims, a "fine particle size filler" is one having a weight average particle size of less than about 50 microns. Examples of one particle size fillers which can be used include 120, 325, and 400 mesh silicas, available from Smith Chemical & Color Co., Jamaica, NY: Imsil ® amorphous silica available from Illinois Mineral Co., Cairo, IL: Duramite ® calcium carbonate, available from Thompson, Weinman & Co., Cartersville, GA; and No. 1 barytes (barium sulfate), available form Pfizer Corp., Easton, PA. The fine particle size filler contributes to the compressive strength of the cured coating composition, with compressive strength and particle size inversely related in general. However, if too fine a particle size filler is employed, the resulting coating composition or mortar can become too thick and sticky for easy application. The weight ratio of fine filler to coating composition solids depends on the particle size of the fine particle size filler used, the rheological requirements of the coating, and the chemical nature of that filler.

The cementitious composition of the present invention can be mixed from the components thereof using conventional methods and equipment. Preferably, two intermediate components are first prepared, packaged, and stored, and then subsequently transported to the application site where they are mixed together with water in proportion to provide the cementitious composition. One component is preferably a "dry mix" including the fine particle size filler, if any, other fillers such as large particle size sand or aggregate, the hydraulic cement, and the liquid epoxy resin. These components can be mixed using conventional equipment for mixing particulate minerals, such as ribbon or rotary blenders. Preferably, the optional large particle size filler is first charged to the mixer, and the liquid epoxy resin is blended in. After thorough mixing, the hydraulic cement is mixed in, along with any fine particle size filler, and the mixing is continued to form the "dry mix." This order of addition is preferred to avoid the formation of clumps which tend to occur when the epoxy resin is blended first with the hydraulic cement or another fine particle size material.

The second component or "wet mix" preferably includes the polymeric latex, the amine-functional epoxy curing agent, any optional water-soluble accelerator for the hydraulic cement, and optionally the epoxy- or amine-functional silane, and can be prepared using any conventional low shear mixing equipment for liquids, with care being taken to avoid shear-induced coagulation or destabilization of the polymer latex.

Preferably, a sodium ion-containing accelerator for speeding the cure of the hydraulic cement is included in the coating composition of the present invention. Sodium carbonate and sodium hydroxide are preferred. The accelerator is preferably included in an amount effective to accelerate the cure of the hydraulic cement. For example, sodium carbonate can be used at a level of about 0.5 weight percent on hydraulic cement solids; and sodium hydroxide can be used at a level of about 2.0 weight percent on hydraulic cement solids. These accelerators can be included in either the wet mix or the dry mix.

Depending on the proportion of solids in the polymer latex and consequently in the wet mix, if separate dry and wet mixes are prepared, it may be desired to mix additional water at the application site with the dry and wet mixes to provide adequate water for complete cure of the hydraulic cement. The ratio of water to hydraulic cement required for sufficient cure of the hydraulic cement depends on the nature of the hydraulic cement, the amount of cement included in the dry mix, the nature of the application including the thickness of the fluid coating composition applied and the environmental conditions at the job site, the desired rheologicla properties of the fluid cementitious coating composition and manner of application (for example, by trowelling or by spray application), whether a barrier coating or covering material is to be applied to retard loss of water by evaporation, and like factors, as are known in the art. In general, the optimal proportion of total water can be determined by simple experimentation. In one presently, preferred embodiment, the weight ratio of total water to Portland cement is about 0.4 to 1.

If desired, other components can be included in the wet mix, such as small amounts of defoaming agents; preservatives for the organic components such as fungicides and bacteriostats; uv stabilizers; colorants such as colored pigments and dyes; thickeners such as polyelectrolyte and cellulosic thickeners; rheology control agents such as associative thickeners and the like; cosolvents; additional water to adjust the solids leave, and the like.

The compositions of the present invention can be used for multiple purposes. For example, they can be used as a bond coat or adhesive in adhering new Portland cement concrete to existing concrete, such as a new concrete overlay for an existing concrete floor; as a grout to repair cracks in existing concrete structures; as a bonding agent to adhere fresh Portland cement concrete to steel reinforcing rods or plates, as, for example, in pre-tensioned or post-tensioned structural elements; as an adhesive grout for bonding aggregates, panels, or the like to walls to provide a decorative effect; as a protective overlay for concrete structures such as dams, bridge decks, piers, utility pylons, buildings, and the like subject to exterior exposure. The compositions can be used as flooring overlay and coatings over existing or new concrete, metal, or wood flooring, where protection against chemical attach is desired, such as in chemical plants, oil refineries, electroplating facilities, and the like, where exposure to acid is encountered, and also such as in food preparation facilities, soft-drink bottling plants, meat packing facilities, and dairies, where exposure to organic acids and alkalies occurs. Further, these coating compositions can be used as a protective coating for stone and concrete building facades and sculpture subject to degradation from acid rain; and the like. In general, the coating compositions of the present invention can be applied over a wide range of thicknesses, depending on the requirement of the application.

The following examples are illustrative of the compositions and processes of the present invention, and will be useful to those of ordinary skill in the art in practicing the invention. However, the invention is in no way limited by these examples.

Unless otherwise specified, all percentages and proportions given in the following examples are by weight. The following test procedures were employed unless otherwise stated below.

Compressive strength was determined as follows: Wet coating composition was packed into 12.7 mm (½ inch) cube molds. The cubes were demolded after 18-24 hr., and aged at room conditions before testing. Cubes were tested using a Model 900 Versa-Loader (Soiltest, Inc., Lake Bluff, IL) compression loading machine with a PR-60 proving ring. The rate of loading was 2 mm/min (0.08 in/min).

To evaluate thermal shock, coating composition was applied to concrete blocks and subjected to a cold-hot cycling test as follows:

| Thermal Shock Test Procedure | | |
|---|---|---|
| Cycle | Test Condition | Length of Time |
| 0 | Room Temp. | — |
| 1 | Freezing, −3° F. (−16° C.) | 16 hrs. |
| 2 | Room Temp. | 8 hrs. |
| 3 | Freezing, −3° F. (−16° C.) | 16 hrs. |
| 4 | Hot water, 195–205° F. | 90 sec. |
| 5 | Room Temp. | 8 hrs. |
| 6 | Freezing, −3° F. (−16° C.) | 16 hrs. |
| 7 | Heat, 225° F. oven | 8 hrs. |
| 8 | Freezing, −3° F. (−16° C.) | 16 hrs. |
| 9 | Hot Water, 195° F.–205° F. (90–95° C.) | 1–2 min. |
| 10 | Room Temp. | 7¾ hrs. |
| 11 | Freezing, −3° F. (−16°) | 16 hrs. |
| 12 | Heat, 275° F. (135° C.) | 8 hrs. |
| 13 | Freezing, 70° F. (−16° C.) | 16 hrs. |
| 14 | Room Temp. | 7¾ hrs. |
| 15 | Freezing, −3° F. (−16° C.) | 16 hrs. |
| 16 | Heat, 350° F. (177° C.) | 8 hrs. |
| 17 | Freezing, −3° F. (−16° C.) | 16 hrs. |
| 18 | Heat, 225° F. | 8 hrs. |
| 19 | Freezing, −3° F. (−16° C.) | 16 hrs. |
| 20 | Room Temp | 8 hrs. |

Concrete blocks (304.8 mm × 152.4 mm (12 in × 6 in), Pre-Cast concrete Products, Lansdale, PA) were used as supplied without surface treatment. A 127 mm (5 in) long strip of 2.54 × 10⁻² mm × (1 mil) Mylar® film was centered on the block and coating composition was applied over a 254 mm × 101.6 mm (10 in × 4 in) area. The coating compositions were aged at least two weeks at room conditions before testing. They were not heat cured.

EXAMPLE 1

247.1 parts by weight of MDC-2 (angular particles) (MDC Industries, Philadelphia, PA) sand, 247.1 parts by weight of Ottawa 20–30 mesh (round particle) (Fisher Scientific Co.) sand, and 247.1 parts by weight of 70 mesh (MDC Industries) sand were charged to a Hobart Model K5SS mixer (Hobart, Inc., Troy, OH) and blended at low speed. 11.4 parts by weight of Epon 828 (digycidyl ether of bisphenol A, 185–192 epoxy equivalent weight, Shell Chemical Co., Atlanta, GA) liquid epoxy resin were gradually added with mixing of the sand, and the mixture is subsequently mixed until the epoxy resin is well dispersed in the sand (approximately fifteen minutes). Subsequently, 247.1 parts by weight Type III Portland cement (Allentown Cement Co., Allentown, PA) is added to the mixture of sand and epoxy resin and mixing is continued until the cement is well dispersed. When this order of addition is observed, a uniform mixture free of clumps is obtained, while if the cement is added before the epoxy resin the mixture may tend to form clumps when the epoxy resin is added.

The resulting dry mix appeared to be free flowing material with no obvious liquid present.

68.4 parts by weight of an acrylic polymer latex polymerized from a monomer mixture having a monomer composition of 45.6 percent by weight on polymer solids butyl acrylate, 52.4 percent by weight methyl methacrylate, 1 percent by weight of a copolymerizable ureido functional monomer (0.005 moles ureido functionality per gram monomer), and 1 percent by weight methacrylic acid (average latex particle size 160 nanometers, 50.0 percent by weight total solids), was mixed with 11.4 parts by weight Jeffamine® D-230 polypropylene oxide diamine (approximate molecular weight 230, Texaco Chemical Co., Bellaire, TX), and 2.95 parts by weight Triton® X-405 nonionic surfactant (70% solids, Rohm and Haas Co., Philadelphia, PA) using a propeller agitator to provide a mixture having a pH of about 10.3 and viscosity of about 70 centipoise. Subsequently, 0.7 parts by weight Nopco NXZ defoamer (Nopco Chemical Div., Diamond Shamrock Chemical Co., Newark, NJ) and 63.9 parts by weight water were mixed therewith to provide a wet mix.

139.7 parts by weight of wet mix were added to 999.8 parts by weight of dry mix and blended by hand with a spatula for five minutes to form a coating or mortar composition according to the present invention. The resulting coating composition has 5.0 weight percent organic material based on total solids, and 8.68 weight percent water in the wet coating composition. The weight ratio of water to cement is 0.40 and the weight ratio of organic material to cement is 0.21.

EXAMPLE 2

The preparative process of Example 1 was repeated, except that 12.36 parts per weight (0.5% based on weight of cement) of sodium carbonate was added to the wet mix as an accelerator for the cure of the Portland cement.

EXAMPLES 3–4

The preparation processes of Examples 1 and 2 were repeated, except that Type I Portland cement (Allentown Cement Co., Allentown, PA) was substituted for the Type III Portland cement.

Samples of the coating compositions of Examples 1–4 were packed into 12.7 mm (½ inch) cube molds. The cubes were demolded after 18-24 hours and aged subsequently indoors. The compressive strength of the cubes as a function of aging is shown in Table I. The results show that use of Type III Portland cement and sodium carbonate accelerator is preferred to provide high early strength. Thermal shock test results for Example 1 reported in Table I show that the composition has good resistance to thermal shock.

TABLE I

|  | Example 1 | Example 2 | Example 3 | Example 4 |
|---|---|---|---|---|
| cement type | III | III | I | I |
| % sodium carbonate[1] | 0 | 0.5 | 0 | 0.5 |
| Compressive strength (psi): | | | | |
| 1 day | 870 | 2920 | 650 | 1610 |
| 2 days | 2890 | 5500 | — | — |
| 14 days | 4800 | 7500 | 6800 | 6800 |
| thermal shock test: | pass 20 cycles | — | — | — |

[1]Weight percent based on weight of cement

The chemical resistance of 12.7 mm cubes of the coating composition of Example 2, cured 14 days under indoor ambient conditions, is shown in Table II. Good resistance to organic solvents and aqueous acids is shown, compared with a conventional latex cement modified coating composition (Acryloid® MC-1834 Rohm and Haas Co., Philadelphia, PA)

TABLE II

|  | Compressive Strength (psi) | |
|---|---|---|
| Cure conditions/ exposure | Example 2 | Comparative Example 1 |
| 14 day ambient | 6680 | 4372 |
| 7 day cure/7 day soak: | | |
| in water | 4560 | 2395 |
| in 10 citric acid | 2850 | disintegrated |
| in 10 lactic acid | 3080 | disintegrated |
| in xylene | 2425 | cracked |

The coating composition of Example 2 was formed into cylinders 6.4 mm thick and 3.81 cm in diameter, and the splitting tensile strength was measured as a function of cure at indoor ambient conditions. The splitting tensile strength of the cured composition is compared with that of the conventional latex cement modifier in Table III. The composition of the present invention showed improved strength and retention of strength after soaking in water, when compared with the conventional latex cement modifier.

TABLE III

|  | Splitting Tensile Strength (psi) | |
|---|---|---|
| Cure conditions | Example 2 | Comparative Example 1 |
| 14 day ambient | 920 | 780 |
| 7 day dry/7 day water | 680 | 450 |

EXAMPLES 5-7

The preparation process of Example 1 was repeated using the polymer latexes shown in Table IV with the following dry mix and wet mix formulation to give the coating compositions of Table V:

| Dry mix: | |
|---|---|
| MDC-2 sand[1] | 37.07 parts by weight |

| -continued | |
|---|---|
| Ottawa 20-30 sand[2] | 37.07 |
| 70 mesh sand[3] | 37.07 |
| Type I Portland cement[4] | 37.07 |
| Epon 828 epoxy resin[5] | 1.72 |
|  | 150.0 |

| Wet mixes: | | |
|---|---|---|
|  | Formulation A | Formulation B |
| polymer latex (50%) | 10.2 | 10.2 |
| Triton X-405 (70%)[6] | 0.44 | 0.44 |
| Jeffimine D-230[7] | 0.53 | 0.53 |
| aminoethylaminopropyl triethoxy silane[8] | 0.05 | 0 |
| Nopco NXZ defoamer[9] | 0.10 | 0.10 |
| water | 6.61 | 6.61 |

[1]MDC Industries, Philadelphia, PA.
[2]Fisher Scientific Co., Pittsburgh, PA.
[3]MDC Industries.
[4]Allentown Cement Co., Allentown, PA
[5]Shell Chemical Co., Atlanta, GA.
[6]Rohm and Haas Co., Philadelphia, PA. This level represents 6 weight percent surfactant solids on latex solids. When the polymer latex includes nonionic surfactant added in the polymerization process, the amount added after polymerization can be reduced proportionately.
[7]Texaco Chemical Co., Bellaire TX.
[8]Petrarch Systems (Huls), Bristol, PA.
[9]Nopco Chemicals Div., Diamond Shamrock Chemical Co., Newark, NJ.

TABLE IV

| | Monomer Composition | | | |
|---|---|---|---|---|
| Polymer latex | butyl acrylate | methyl methacrylate | methacrylic acid | ureido-functional monomer |
| A[1] | 50 | 48.5 | 1.5 | 0 |
| B[2] | 45.5 | 53.2 | 1.3 | 0 |
| C[3] | 45.6 | 52.4 | 1 | 1 |
| D[4] | 45.6 | 52.4 | 1 | 1 |

[1]6 weight percent Triton X-405 nonionic surfactant added based on monomer weight.
[2]0.4 weight percent sodium lauryl sulfate anionic surfactant added based on monomer weight.
[3]0.4 weight percent sodium lauryl sulfate; ureido functional monomer has 0.004 moles ureido functional groups per gram of ureido functional monomer.
[4]0.4 weight percent sodium lauryl sulfate; ureido functional monomer has 0.005 moles ureido functional groups per gram of ureido functional monomer.

The effect of the presence of ureido functionality in the polymer latex on the pot life of coating compositions prepared using the polymer latexes of Table IV and Formulations A and B was determined and is reported in Table V. The pot life is defined to be the elapsed time between the time of mixing of the wet and dry mixes together and the time at which the resulting wet coating composition loses fluidity. AFter loss of fluidity, the coating composition becomes dry and crumbly. Without intending to be bound by a particular explanation or theory, this phenomenon is believed to be associated with loss of colloidal stability resulting from flocculation by divalent ions. As can be seen by the data presented in Table V, the presence of ureido functionality in the polymer latex surprisingly provides coatings compositions with unexpectedly lengthy pot lives.

TABLE V

| Example | Coating Formulation | Latex | Wt. % X-405 solids on Latex Solids | Coating Pot Life (minutes) |
|---|---|---|---|---|
| Example 5 | A | C | 6[1] | More than 30 |
| Example 6 | A | C | 6[1] | More than 30 |
| Example 7 | B | C | 6[1] | More than 30 |
| Comparative 2 | A | A | 6[2] | Less than 3 |
| Comparative 3 | A | B | 6[1] | About 5 |
| Comparative 4 | A | C | 3[1] | Less than 3 |

TABLE V-continued

| Example | Coating Formulation | Latex | Wt. % X-405 solids on Latex Solids | Coating Pot Life (minutes) |
|---|---|---|---|---|
| Comparative 5 | A | D | 6[1] | More than 30 |

[1]Triton ® X-405 surfactant added during preparation and neutralization of emulsion.
[2]Triton X-405 surfactant post-added to latex after neutralization and storage.

EXAMPLES 8-10

The preparation process of Example 1 was repeated using the polymer latex D and formulation B, except that either 0.5 weight percent (on cement) sodium carbonate or 2.0 weight percent (on cement) sodium hydroxide was added to the wet mix to provide Examples 9 and 10. Example 8 was prepared using polymer latex D and formulation B, but no accelerator was included. Splitting tensile strengths were measured after a one day ambient cure, and the results of the measurement are displayed in Table VI. As can be seen in Table VI, addition of either sodium carbonate or sodium hydroxide significantly accelerates the cure of the coating composition.

TABLE VI

| Example | Accelerator | Splitting tensile strength (psi) |
|---|---|---|
| 8 | None | 97 |
| 9 | 0.5% sodium carbonate | 180 |
| 10 | 2.0% sodium hydroxide | 396 |

Various modifications can be made in the details of the various embodiment of the compositions and processes of the present invention, all within the spirit and scope of the invention as defined by the appended claims.

We claim:

1. A polymer-modified cementitious composition having improved chemical resistance, the composition comprising:
   (a) at least one hydraulic cement,
   (b) at least one synthetic film-forming, alkali-stable synthetic polymer latex, the latex polymer including ureido functional groups,
   (c) at least one liquid epoxy resin, and
   (d) at least one amine-functional epoxy curing agent, the curing agent being dispersable or soluble in water.

2. A cementitious composition according to claim 1 wherein the hydraulic cement is Portland cement.

3. A cementitious composition according to claim 2 further comprising sodium ion-containing hydraulic cement accelerator.

4. A cementitious composition according to claim 3 wherein the hydraulic cement is Type III Portland cement.

5. A cementitious composition according to claim 3 wherein the hydraulic cement is Type I Portland cement.

6. A cementitious composition according to claim 5 wherein the accelerator is sodium carbonate.

7. A cementitious composition according to claim 5 wherein the accelerator is sodium hydroxide.

8. A cementitious composition according to claim 1 wherein the synthetic polymer latex is an acrylic polymer latex polymerized from monomers including at least about 80 percent by weight polymerizable (meth)acrylic monomers.

9. A cementitious composition according to claim 1 wherein the synthetic polymer latex is polymerized from monomer including from about 0.002 to 0.006 moles uriedo functional monomer per 100 grams of polymer latex solids.

10. A cementitious composition according to claim 7 wherein the uriedo functional monomer comprises (meth)acrylic monomer.

11. A cementitious composition according to claim 1 wherein the weight ratio of the organic material to hydraulic cement is from about 0.1 to 0.3.

12. A cementitious composition according to claim 1 wherein the glass transition temperature of the polymer latex is from about 0° to 30° C.

13. A cementitious composition according to claim 1 wherein the mole ratio of the epoxy groups of the liquid epoxy resin to the amine groups the amine-functional epoxy curing agent is from about 0.8 to 1.2.

14. A cementitious composition according to claim 1 wherein the weight ratio of polymer latex solids to the sum of the weights of the liquid epoxy resin and the amine-functional epoxy curing agent is from about 60:40 to 75:25.

15. A cementitious composition according to claim 1 further including at least one amine-functional silane.

16. A curable latex composition for use in preparing a composition including hydraulic cement for coating or overlaying Portland cement concrete, the curable latex composition comprising:
   (a) an alkali-stable, film-forming synthetic polymer latex having ureido functionality, and
   (b) an amine-functional epoxy curing agent, the epoxy curing agent being soluble or dispersible in water.

17. A two-component composition for use in preparing a coating composition for coating or overlaying Portland cement concrete, the composition comprising:
   (a) a first component including:
      (1) at least one hydraulic cement, and
      (2) at least one liquid epoxy resin; and
   (b) a second component including:
      (1) at least one synthetic film-forming, alkali-stable synthetic polymer latex, the latex polymer including ureido functional groups, and
      (2) at least one amine-functional epoxy curing agent, the curing agent being disperable or soluble in water.

18. A process for protecting a Portland cement concrete surface, the process comprising:
   (a) applying a fluid protective coating composition to the surface, the coating composition comprising:
      (1) at least one hydraulic cement,
      (2) at least one synthetic film-forming, alkali-stable synthetic polymer latex, the latex polymer including ureido functional groups,
      (3) at least one liquid epoxy resin, and
      (4) at least one amine-functional epoxy curing agent, the curing agent being dispersable or soluble in water; and
   (b) permitting the coating composition to cure to form a protective coating.

19. An article formed from Portland cement concrete and having a protective coating formed on at least a portion of the surface of the article, the protective coating being formed from a composition comprising:

a) at least one hydraulic cement,
b) at least one synthetic film-forming, alkali-stable synthetic polymer latex, the latex polymer including ureido functional groups,
c) at least one liquid epoxy resin, and
d) at least one amine-functional epoxy curing agent, the curing agent being dispersable or soluble in water.

* * * * *